Patented July 18, 1939

2,166,257

UNITED STATES PATENT OFFICE 2,166,257

TITANIUM PIGMENT AND PROCESS FOR PRODUCING THE SAME

Willard H. Madson, Linthicum Heights, Md., assignor to E. I. du Pont de Nemours & Company, Wilmington, Del., a corporation of Delaware No Drawing. Application April 28, 1937, Serial No. 139,497

16 Claims. (Cl. 134—58)

This invention relates to a process for producing titanium pigments of special and highly improved pigmentary properties. More particularly the invention has reference to the production of titanium pigments especially resistant towards discoloration, particularly when employed in high temperature baking enamels or similar compositions.

Untreated titanium pigments such as white titanium oxide exhibit gradual color change when employed in such coating compositions as baking enamels. Such change is usually yellowish, yellowish brown, or even reddish brown, and in some instances it is so severe that titanium oxide cannot be used as the pigment, and in lieu thereof other lower hiding pigments must be used which is a distinct disadvantage.

I have found that such objectionable discoloration which untreated titanium pigments exhibit may be easily and effectively overcome. It is among the objects of the present invention, therefore, to provide a direct, simple, and economical method for treating such pigments, whereby they manifest superior tint retention as well as high resistance towards discoloration and yellowing.

Broadly, the invention comprises treating a calcined titanium pigment with an addition agent, such as a soluble salt of beryllium, and precipitating or incorporating a small amount of the beryllium in insoluble form in the pigment.

In a more specific and preferred embodiment, the invention contemplates adding a soluble salt of beryllium to a suspension or water slurry of calcined titanium oxide, and precipitating an insoluble beryllium hydrate or oxide on said pigment by adjusting and controlling the pH value of the mixture.

In order that the invention may be more clearly understood, the following examples are given, all of which are merely illustrative:—

Example 1

An aqueous solution of $Be(SO_4)_2.4H_2O$ containing 199 grams of this salt per liter was prepared. A 790 cc. portion of this solution was added to 10 liters of a ground $TiO_2$ slurry containing 2500 grams of pigment. The pH was then adjusted to 7.2 with caustic soda solution and the whole was filtered, washed and dried. The titanium pigment recovered as a result of the foregoing operation contained 1.5% beryllium hydroxide.

Example II 53 cc. of a solution containing 199 grams of $Be(SO_4)_2.4H_2O$ per liter were diluted to 10 liters with water and a caustic soda solution was added until the supernatant liquid showed a pH of 7.0. The suspension was then filtered and washed. The resulting filter cake was again suspended in water and blended with a slurry containing 2500 grams $TiO_2$ in about 10 liters. After thorough mixing the solids were filtered and dried. The titanium pigment recovered as a result of the foregoing operation contained 0.1% of beryllium hydroxide.

Example III

An aqueous solution of beryllium sulphate containing 150 grams of $Be(SO_4)_2.4H_2O$ per liter was prepared. 5 liters of this was added to an aqueous suspension of pigment containing 7000 grams of $TiO_2$. The pH was adjusted to 7.4 with a barium hydrate solution and the whole filtered and dried without washing. The titanium pigment recovered as a result of the foregoing operation contained 2.7% beryllium hydroxide.

It will be noted that in the instance of Example I, an appreciable amount of soluble salts will be present (chiefly sodium sulfate resulting as a by-product of the reaction), whereas in the processes of Examples II and III no soluble salts will be present or introduced as a result of treatment.

The treated pigments resulting from my invention will manifest superior discoloration resistance as against untreated titanium pigments, when formulated in baking enamels such as an enamel based on a drying oil modified polyhydric alcohol polybasic acid resin, in which the drying oil content may be 50%. Pigmentation in the ratio of 80 parts by weight of pigment to 100 parts vehicle solids will provide a satisfactory enamel, and the enamel may be then sprayed on metal panels and baked for substantially one hour at a temperature of substantially 260° F. A second coat may then be aplied and baked in the same manner. For comparative purposes a like enamel may be prepared but pigmented with untreated titanium oxide. When the resultant panels are subjected to usual discoloration tests, it will be found that even after prolonged exposure to heat treatment the panel coated with the enamel containing untreated $TiO_2$ will discolor badly, whereas the composition containing the treated titanium oxide pigment will exhibit very good color retention and discoloration resistance. The panels may be graded on an arbitrary scale in which one unit will represent a distinct visual color difference. On such scale, the composition containing my treated pigment will show a superiority of approximately 15 units over the similar composition pigmented with untreated titanium oxide.

In adapting the invention to practice, it will be obvious that the aqueous solution of beryllium salt may be intimately mixed with the suspension or slurry of titanium pigment in any desired manner, the mixture then being subjected to efficient agitation through the media of mechanical stirrers or milling apparatus such as a ball mill. Preferably, a wet slurry of finely-ground titanium dioxide such as that obtainable in the process disclosed by U. S. Hanahan Patent No. 1,937,037 is utilized in the invention because of its exceptional fineness and freedom from coarse particles which are objectionable in the finest enamels. The flocculated slurry containing about 250 grams of $TiO_2$ per liter will prove an excellent starting material, although of course flocculation prior to treatment is not necessary, but merely preferable, since the elimination of much water that would otherwise be present in the grinding system is thus effected. Similarly, the use of a thickened slurry permits the employment of small tanks for treatment, and accordingly this method is preferred, due to its economic advantages. The $TiO_2$ slurry may be treated with the novel soluble beryllium compounds in and desired manner. For instance, the beryllium compound may be added to the slurry followed by pH adjustment with any suitable alkaline reagent, such as an oxide, hydroxide, or carbonate of the alkali or alkaline earth metal groups. Preferably, however, reagents such as ammonium, sodium, or barium hydroxide, are utilized. The less costly calcium compounds when free from grit may also be employed in the process.

Magnesium, potassium and strontium compounds are quite satisfactory, although due to economic phases involving the use of potassium and strontium, these are not preferred. Upon adjustment of the pH value of the resultant mixture, preferably to neutralization and around a pH of 7, (although pH ranges from substantially 5 to 8 will prove utilizable and are therefore contemplated) precipitation will be effected and milling may be continued for a short while, if desired, after which the titanium pigment containing the precipitated oxide or hydrate is then removed from the mother liquor, and recovered after washing and drying in any conventional manner.

As an alternative operation, the beryllium hydroxide suspension may be separately prepared by precipitation of a soluble beryllium compound with suitable neutralizing agents, and then mixing the beryllium hydroxide with a titanium pigment.

It will be found that beryllium addition to the pigment may be effected at ordinary temperatures, and that it will be most effective and therefore preferable to mix the same with the pigment while freshly prepared. Furthermore, drying of the beryllium hydrate prior to addition of the pigment has a tendency to decrease its effectiveness to such extent that it may become undesirable for use, due to the fact that a slightly greater amount may be employed in order to obtain equally beneficial results.

While in the foregoing examples specific quantities of beryllium hydrate have been precipitated upon or incorporated in the titanium pigment, it will be obvious that the amount of treating agent employable is subject to variance and within wide limits, depending upon the yellowing or chalking tendency of the pigment under treatment. Thus, for example, if a pigment possesses little resistance to yellowing, a larger amount of treating agent will be employed, whereas a less and lighter treatment may be utilized in instances where the pigments exhibit a somewhat lessened tendency towards yellowing. Generally, however, it will be found that the amount of added beryllium hydrate employed may range to as high as 10% or higher, based on the weight of the pigment, and calculated as the hydrate. Usually, however, an amount of added hydrated oxide of beryllium hydrate ranging from .02% to 1.5%, based on the weight of the pigment, will prove practically beneficial, and accordingly such range is suggested for preferable use.

Although the invention has been illustratively described in the foregoing examples employing as a preferred agent beryllium sulfate, other soluble salts of beryllium may be substituted therefor. For example, beryllium salts such as beryllium nitrate, the soluble halogen salts of beryllium, particularly the bromides, chlorides or fluorides, both simple and complex, may be utilized. In addition, the beryllates may also be employed, particularly the alkali metal beryllates such as $Na_2BeO_2$ (or $Be(OH)_2$ dissolved in NaOH) may also be used. In the latter instances, it will of course be necessary to employ suitable acidifying agents to adjust the pH of the solution and effect precipitation of the insoluble beryllium compound on the pigment.

While the invention has been described with particular reference to the treatment of pure titanium dioxide pigments, it has application to other titanium pigments as well. The term "titanium pigments", as here employed and in the appended claims, includes not only titanium dioxide pigments but those containing the usual extenders such as calcium sulfate, barium sulfate, or silicates, and likewise includes the metal titanate pigments, particularly those of magnesium, barium, zinc, etc.

I claim as my invention:—

1. A process for producing a white stable titanium pigment, comprising incorporating in said pigment subsequent to calcination a minor amount of a precipitated, insoluble beryllium compound from the group consisting of an oxide and hydroxide.

2. A method for producing a titanium pigment stable against discoloration, comprising intimately mixing a suspension of calcined titanium pigment with an aqueous solution of a soluble beryllium salt, and adding sufficient alkaline agent to the resultant mixture to precipitate .02% to 10% of an insoluble beryllium compound from the group consisting of an oxide and hydroxide on the pigment.

3. A method for producing a titanium pigment stable against discoloration, comprising intimately mixing a suspension of calcined titanium pigment with an aqueous solution of a soluble beryllium salt, and adding sufficient alkaline agent to the resultant mixture to precipitate .02% to 1.5% of an added insoluble beryllium compound from the group consisting of an oxide and hydroxide on the pigment.

4. A method for producing a titanium pigment stable against discoloration, comprising intimately mixing an aqueous suspension of calcined titanium pigment with a solution of beryllium sulfate, and precipitating an insoluble beryllium compound from the group consisting of an oxide and hydroxide on said pigment by addition of an alkaline agent to the resultant mixture.

5. A method for producing a titanium pigment stable against discoloration, comprising intimately mixing an aqueous suspension of calcined titanium pigment with a solution of beryllium sulfate, and precipitating an insoluble beryllium compound from the group consisting of an oxide and hydroxide on said pigment by addition of an alkaline hydroxide.

6. A method for producing a titanium pigment stable against discoloration, comprising intimately mixing an aqueous suspension of calcined titanium pigment with a solution of beryllium sulfate, and precipitating an insoluble beryllium compound from the group consisting of an oxide and hydroxide on said pigment by addition of barium hydroxide.

7. As a new article of manufacture, a titanium pigment having a minor amount of a stabilizing agent precipitated thereon subsequent to calcination, comprising an insoluble beryllium compound from the group consisting an an oxide and hydroxide.

8. As a new article of manufacture, a titanium pigment having a stabilizing agent precipitated thereon subsequent to calcination, comprising .02% to 10% beryllium hydroxide.

9. As a new article of manufacture, a titanium pigment having a stabilizing agent precipitated thereon subsequent to calcination, comprising 0.2% to 1.5% beryllium hydroxide.

10. A method for producing a stable titanium pigment, comprising mixing an aqueous solution of a soluble beryllium salt with a suspension of calcined titanium pigment, adding a neutralizing agent to the resultant mixture to adjust its pH value to a point where a small amount of an insoluble beryllium compound from the group consisting of an oxide and hydroxide becomes precipitated on said pigment.

11. A method for producing a stable titanium oxide pigment, comprising adding an aqueous solution of a soluble salt of beryllium to a suspension of calcined titanium oxide, and adjusting the pH value of the resultant mixture by addition of a neutralizing agent thereto to precipitate a small amount of an insoluble beryllium compound from the group consisting of an oxide and hydroxide upon said pigment.

12. A method for producing a titanium pigment stable against discoloration, comprising intimately mixing a suspension of calcined titanium pigment with an aqueous solution of a soluble beryllium salt, adjusting the pH value of the resultant mixture within a range of about 5.0 to 8.0 by addition of a neutralizing agent thereto, whereby a small amount of an insoluble beryllium compound from the group consisting of an oxide and hydroxide becomes precipitated on said pigment.

13. A method for producing a titanium pigment stable against discoloration, comprising intimately mixing a suspension of calcined titanium pigment with an aqueous solution of a soluble salt of beryllium, and adding an alkaline agent to the resultant mixture to adjust its pH value within a range of from 5.0 to 8.0, whereby a small amount of an insoluble beryllium compound from the group consisting of an oxide and hydroxide becomes precipitated on said pigment.

14. A method for producing a titanium pigment stable against discoloration, comprising intimately mixing a suspension of calcined titanium pigment with an aqueous solution of a soluble beryllium salt, adding a neutralizing agent to the resultant mixture to adjust the pH value thereof within about 5.0 to 8.0, whereby from about .02% to 2.5% of beryllium hydroxide becomes precipitated on said pigment.

15. As a new article of manufacture, a white, stable titanium pigment containing as an essential ingredient a precipitated insoluble beryllium compound from the group consisting of an oxide and hydroxide, said compound being incorporated in said pigment subsequent to pigment calcination.

16. As a new article of manufacture, a stable titanium pigment containing a minor amount of precipitated insoluble beryllium hydroxide incorporated in said pigment subsequent to pigment calcination.

WILLARD H. MADSON.